United States Patent [19]

Levati

[11] Patent Number: 5,193,571
[45] Date of Patent: Mar. 16, 1993

[54] VALVE FOR THE MAINTENANCE OF STERILE CONDITIONS IN A FILLER MACHINE

[75] Inventor: Ennio Levati, Parma, Italy
[73] Assignee: Fenco S.P.A., Parma, Italy
[21] Appl. No.: 824,802
[22] Filed: Jan. 22, 1992
[30] Foreign Application Priority Data
  Feb. 19, 1991 [IT] Italy ............ PR91A000008
[51] Int. Cl.$^5$ .............................. F16K 3/36
[52] U.S. Cl. ................... 137/241; 137/614.11
[58] Field of Search .......... 137/238, 241, 613, 614.11, 137/614.16

[56] References Cited

U.S. PATENT DOCUMENTS

| | | | |
|---|---|---|---|
| 3,517,688 | 6/1970 | Scholle | 137/240 |
| 3,643,679 | 2/1972 | Hansson | 137/241 |
| 3,895,651 | 7/1975 | Okada et al. | 137/238 X |
| 4,524,563 | 6/1985 | Sassi | 53/426 |

FOREIGN PATENT DOCUMENTS 1241791 8/1971 United Kingdom .

Primary Examiner—Martin P. Schwadron
Assistant Examiner—Kevin L. Lee
Attorney, Agent, or Firm—Darby & Darby

[57] ABSTRACT

The invention is in the field of filling machines under sterile conditions. More precisely, the invention relates to a valve means for interrupting the feeding of the product to headers and product feeder valves, while preserving the sterile conditions of the product feeder conduit. The valve limits the parts of the machine that are subject to resterilization after maintenance to the headers, which can cause a loss of sterile conditions internally to the headers or the filler valves.

8 Claims, 2 Drawing Sheets

VALVE FOR THE MAINTENANCE OF STERILE CONDITIONS IN A FILLER MACHINE

BACKGROUND OF THE INVENTION

The object of the invention is a valve for the maintenance of sterile conditions in a filler machine.

In the field of such machines, which fill containers with various kinds of food products, one of the causes of long interruptions in productivity is the need to effect a general re-sterilization of the machine components when problems or breakages occur in the headers or filler valves, which require the opening of the headers or valves to effect the necessary maintenance or repair work.

Indeed, repair work to the headers which requires the opening of the headers causes loss of sterile conditions not only in the headers themselves but also in the components connected to them, such as for example the filler valve and the product feeder conduit. The re-sterilization operations are particularly long and therefore bring about considerable costs to the firm due to interruption of production.

SUMMARY OF THE INVENTION

An object of the present invention is that of eliminating the above-described drawbacks and in particular to realize a device for separating the product feeder conduit from the header while maintaining sterile conditions in the conduit and in all the apparatus connected to it, and thus avoiding the need to resterilize in the case of maintenance operations related to the headers and the filler valves.

These objects are fully attained by the valve for the maintenance of sterile conditions, object of the present invention, for filler machines in sterile environments, of the type having one or more headers equipped with filler valves, in which headers a branch of a product feeder conduit is inserted. The valve, associated to each header, comprises means for interrupting the product feeding to the filler valve which is out of order and thus preserving sterile conditions in the product feeder conduit. The valve comprises:

- a first plug, for closing the branch of the product feeder conduit for the header;
- a second plug, applied at a lower end of a stem which is slidable internally to the first plug, the second plug being for sealingly closing under sterile conditions the branch of the product feeder conduit to the header in such a way as to create a chamber between the first and second plugs;
- means for the flow of steam or sterilizing fluid into the chamber, constituted by cavities for the passage of the sterilizing steam between the stem and the plug and internally to the stem, the cavities communicating with two conduits, one inlet conduit and one outlet conduit, of the steam.

BRIEF DESCRIPTION OF THE DRAWING

This and other characteristics will better emerge in the detailed description, which follows, of a preferred embodiment of the invention illustrated in the form of a non-limiting example in the accompanying drawings, in which.

DESCRIPTION OF THE PREFERRED EMBODIMENT

Figure 3:
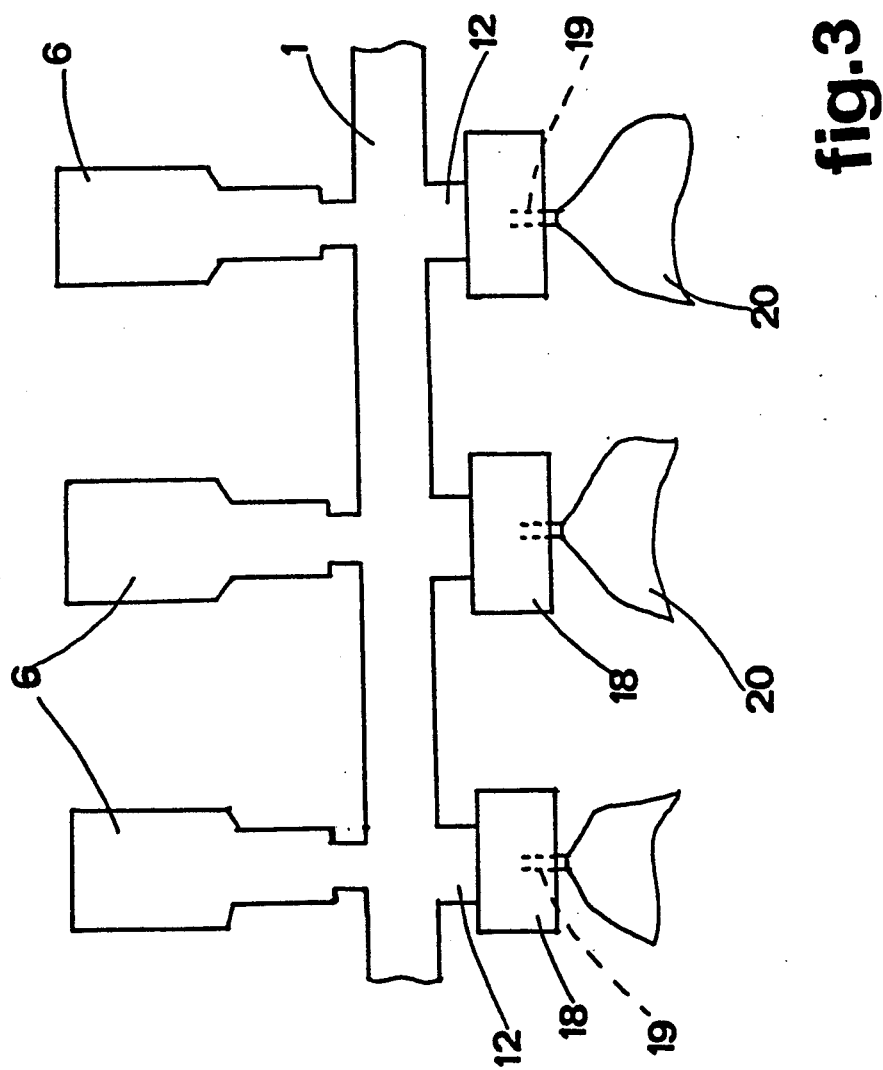
FIG. 3 shows, in a simplified view, a plurality of valves applied to a filler machine.

With reference to the drawings, a product feeder conduit 1 feeds one or more headers 18 of known type, indicated in FIG. 3. The headers 18 are equipped with filler valves 19 through which containers 20 are filled.

A plurality of branches 12 of the conduit 1 place the conduit 1 and the headers 18 in communication.

Figures 1, 2:
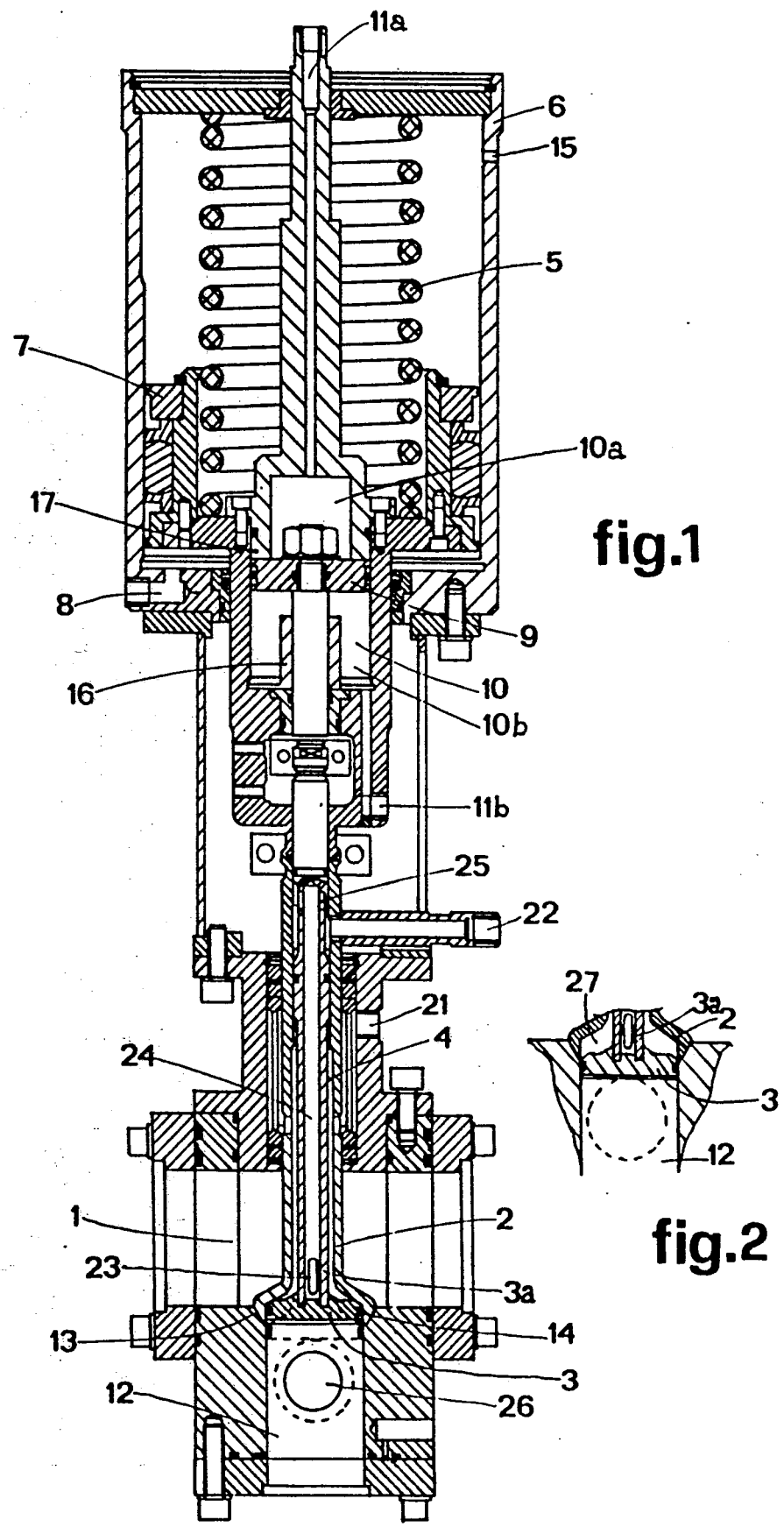
FIG. 1 shows the valve, in a section according to a vertical median plane.
FIG. 2 shows a detail of the valve, according to the same section of FIG. 1, when the valve is activated.

A first plug 2 is used for closing the branch 12 of the conduit 1 by wedging into a conical housing 13, as illustrated in FIG. 1, in such a way as to isolate the conduit 1 from the header 18 associated to the branch 12.

The first plug 2 is connected to a piston 7 housed internally to a cylinder 6 and is vertically mobile.

The plug 2 is kept in a closed position by means of a spring 5 which presses on the piston 7, while the opening of the plug 2 happens by means of the flow of air or other fluid through an aperture 8 bored into the cylinder 6 in such a way as to raise the piston 7, compressing the spring 5.

The cylinder 6 is equipped with a bleeder hole 15.

According to a variant which is not illustrated, it could be envisaged that the spring 5 be positioned below the piston 7 and the aperture 8 above the piston, so that the spring 5 would be compressed when the plug 2 closes the valve.

The spring 5, the piston 7 and the cylinder 6 equipped with aperture 8 and bleed hole 15 constitute means for activating of the first plug 2.

A second plug 3 is applied at the lower end of a stem 3a, which stem 3a is slidable internally to the first plug 2 and which second plug 3 has the purpose of sealingly closing the branch 12 of the conduit 1 by means of a seal ring 14 ("O" ring), as illustrated in FIG. 2.

When the second plug 3 is in the closed position (FIG. 2), a chamber 2 is defined between the second plug 3 and the first plug 2, into which steam or other sterilizing fluid is introduced.

The stem 3a is joined to a piston 9 which piston is slidable internally to a chamber 10 due to the variation of pressure which occurs in two separate spaces 10a and 10b of the chamber 10 when air or other fluid is introduced by means of respective inlet conduits 11a and 11b.

Internally to the chamber 10 there are two piston travel limiters, one lower 16 and one upper 17.

The piston 9, which is slidable internally to the chamber 10, together with the inlet conduits 11a and 11b constitute means to activate the second plug 3.

An inlet conduit 21 and an outlet conduit 22 are provided for sterilizing steam or condensation or other sterilizing fluid.

The steam, entering through the conduit 21 penetrates into a cavity 4 comprised between the first plug 2 and the stem 3a, passes into a cavity 24 internal to the stem 3a through an aperture 23 bored into the stem 3a itself and exits from another aperture 25 towards the outlet conduit 22.

When the stem 3a is lowered, in the closed position illustrated in FIG. 2, the steam or other sterilizing fluid is in proximity to the upper part of the stem 3a, that is, the opposite part with respect to the second plug 3.

The inlet conduit 21 and the outlet conduit 22 for the steam, with the cavities 4 and 24 constitute means for the flow of steam or other sterilizing fluid into the chamber 27.

Said feeding means for the steam or other sterilizing fluid are structured in such a way that there is no possibility of introduction of the product to be delivered into the containers 20 into the inlet and outlet conduits 21 and 22 for the sterilizing fluid or steam, avoiding thus the possibility of blocking the conduits 21 and 22.

The first and second plugs 2 and 3, the stem 3a and the cavities 4 and 24, constitute means for stopping the feeding of the product to the filler valve 19 and at the same time preserving the sterility of the conduit 1.

An advantage of the present invention is that when the headers 18 must be cleaned or maintenance on them must be performed, requiring that they be opened, this can be done without the consequent need to clean and sterilize the entire machine. It is necessary only to sterilize the branch 12 and the portion of the machine between the branch 12 and the filler valve 19 associated with it.

I claim:

1. A valve for maintenance of sterile conditions in a filler machine having a header, said header, into which a branch of a product feeder conduit is inserted, being equipped with a filler valve, said maintenance valve controlling flow of a product from said conduit to said header, comprising:
    a first plug for closing a flow path from said conduit to said branch by sealing on a first surface of said branch, said first plug including a hollow shaft of extended length;
    a second plug connected to a hollow stem, said second plug stem being slidable inside said first plug shaft between a first position where said second plug seals against a surface of said first plug, and a second position wherein said second plug seals on a second surface of said branch, said first and second plugs together forming an internal chamber between them, said chamber communicating with a space between said stem and said shaft, sealing on said first branch surface by said first plug and sealing by said second plug in said first and second positions maintaining said chamber continuously free of said product, said stem including passage means connecting said chamber and space to the interior of said hollow stem;
    means for entrance of a sterilizing agent into said space between said stem and said shaft, and means for discharge of said agent from with said hollow stem, said means for entrance and discharge being at an end of said space and an end of said hollow stem away from said first and second plugs, a continuous flow path being provided for said agent from said entrance through said space between said shaft and said stem, through said chamber and into said hollow stem via said passage means, and through said hollow stem to said discharge means, said seals of said plugs isolating said branch from said conduit and isolating said sterilizing agent from said branch and conduit, conditions of sterility being maintainable in said conduit when said filler valve is out of order;
    means for moving said first plug to open and close said product flow path; and
    means for moving said second plug between said first and said second positions.

2. A valve as in claim 1, wherein said means for moving said first plug include;
    a spring housed in a cylinder, and a piston in said cylinder, said piston being connected to said first plug, said spring biasing said piston to seal against said first branch surface, whereby said valve is normally closed, said cylinder having an aperture for entrance of a pressurizing fluid into said cylinder to move said piston to open said valve by moving said first plug off said first branch surface, said pressurizing fluid overcoming the resistance of and compressing said spring, said spring returning said first plug to the closed position when said pressurizing fluid is released from said cylinder.

3. A valve as in claim 1, wherein said means for moving said second plug includes a second piston connected to said stem, and a chamber, said piston sliding within said chamber, a pressurized fluid introduced into said chamber on one side of said piston driving said second plug to said second position, introduction of said pressurized fluid into said cylinder on the other side of said piston driving said second plug to said first position.

4. A valve as in claim 1, wherein said shaft and said first plug and said stem and said second plug are co-axial, in said first position of said second plug said second plug being recessed within a bore in said first plug, said second plug moving axially between said first and second positions, said branch extending co-axially with said plugs.

5. A valve as in claim 4, wherein said bore is cylindrical and said branch has the same diameter as said second plug and said cylindrical bore in said first plug.

6. A valve as in claim 1, wherein when said second plug moves from said first position to said second position and vice versa contact between said first plug and said second plug is continuously maintained, whereby said product cannot enter said chamber, the internal volume of said chamber increasing when said second plug moves to said second position from said first position.

7. A valve for maintenance of sterile conditions in a filler machine having a header, said header, into which a branch of a product feeder conduit is inserted, being equipped with a filler valve, said maintenance valve controlling flow of a product from said conduit to said header, comprising:
    a first plug for closing a flow path from said conduit to said branch by sealing on a first surface of said branch, said first plug including a hollow shaft of extended length;
    a second plug connected to a hollow stem, said second plug stem being slidable inside said first plug shaft between a first position where said second plug seals against a surface of said first plug, and a second position wherein said second plug seals on a second surface of said branch, said first and second plugs together forming an internal chamber between them, said chamber communicating with a space between said stem and said shaft, sealing on said first branch surface by said first plug and sealing by said second plug in said first and second positions maintaining said chamber continuously free of said product;
    means for circulating a sterilizing agent in said space between said stem and said shaft, in said chamber and within said hollow stem, a continuous flow path being provided for said agent from an entrance to a discharge, said seals of said plugs isolating said branch from said conduit and isolating said sterilizing agent from said branch and conduit, conditions of sterility being maintainable in said conduit when said filler valve is out of order;

means for moving said first plug to open and close said product flow path; and means for moving said second plug between said first and said second positions.

8. A valve for maintenance of sterile conditions in a filler machine having a header, said header, into which a branch of a product feeder conduit is inserted, being equipped with a filler valve, said maintenance valve controlling flow of a product from said conduit to said header, comprising:

a first plug for closing a flow path from said conduit to said branch by sealing on a first surface of said branch, said first plug including a hollow shaft of extended length;

a second plug connected to a hollow stem, said second plug stem being slidable inside said first plug shaft between a first position where said second plug seals against a surface of said first plug, and a second position wherein said second plug seals on a second surface of said branch, said first and second plugs together forming an internal chamber between them, said chamber communicating with a space between said stem and said shaft, sealing on said first branch surface by said first plug and sealing by said second plug in said first and second positions maintaining said chamber continuously free of said product, said stem including passage means connecting said chamber and space to the interior of said hollow stem;

means for entrance of a sterilizing agent into said hollow stem, and means for discharge of said agent from said space between said stem and shaft, said means for entrance and discharge being at an end of said space and at an end of said hollow stem away from said first and second plugs, a continuous flow path being provided for said agent from said entrance, through said hollow stem, through said chamber and via said passage means into and through said space between said shaft and said stem to said discharge means, said seals of said plugs isolating said branch for said conduit and isolating said sterilizing agent from said branch and conduit, conditions of sterility being maintainable in said conduit when said filler valve is out of order;

means for moving said first plug to open and close said product flow path; and means for moving said second plug between said first and said second positions.

* * * * *